March 30, 1926.

M. W. ADKINS

AIRPLANE

Filed August 13, 1925

1,578,377

INVENTOR.
Marion W. Adkins
BY Warren D. House
His ATTORNEY.

Witness:
R. E. Hamilton

Patented Mar. 30, 1926.

1,578,377

UNITED STATES PATENT OFFICE.

MARION W. ADKINS, OF KANSAS CITY, MISSOURI.

AIRPLANE.

Application filed August 13, 1925. Serial No. 49,869.

*To all whom it may concern:*

Be it known the I, MARION W. ADKINS, a citizen of the United States, and a resident of Kansas City, in the county of Jackson and State of Missouri, have invented certain new and useful Improvements in Airplanes, of which the following is a specification.

My invention relates to improvements in airplanes.

It relates particularly to novel means for assisting in lifting and sustaining an airplane.

One of the objects of my invention is to provide novel gas containing means attachable to the upper side of the wing of an airplane, which will present relatively small resistance to the air in the traveling movement of the plane, which is simple, cheap to make, easily attached to and removed from the wing, and which will afford lifting and sustaining power.

A further object of my invention is to provide a novel gas containing tank of the kind described.

Still another object of my invention is to provide novel means for detachably fastening the tank to the wing.

A further object of my invention is the provision of novel and efficient means for bracing an airplane wing.

The novel features of my invention are hereinafter fully described and claimed.

In the accompanying drawings, which illustrate my invention,

Similar reference characters designate similar parts in the different views.

Figure 1:
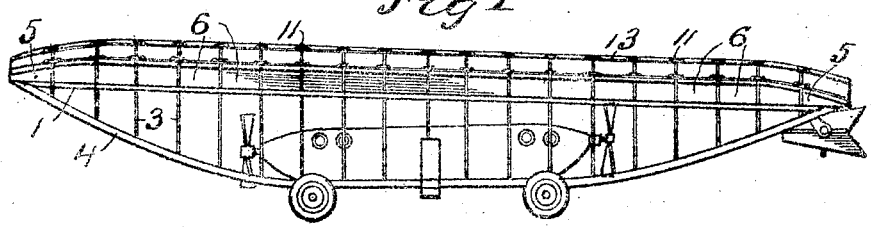
Fig. 1 is a side elevation of my invention shown applied to an airplane of a type in which the wing is disposed longitudinally with respect to the airplane.
Figure 2:
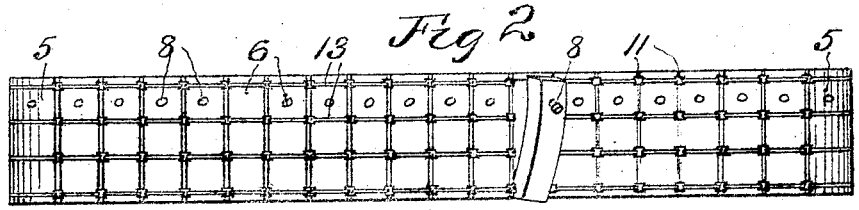
Fig. 2 is a top view of the same, one of the gas containers being shown partly detached.
Figure 3:
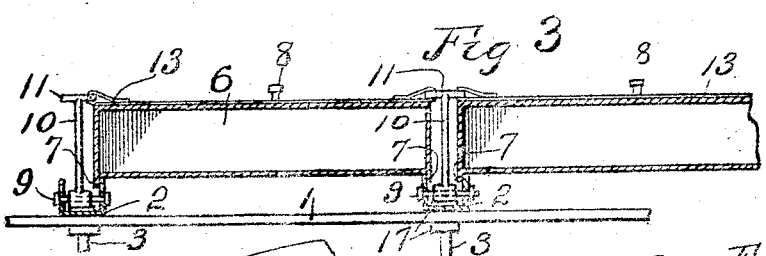
Fig. 3 is an enlarged cross section through two of the gas containers and two of the channel bars.
Figure 4:
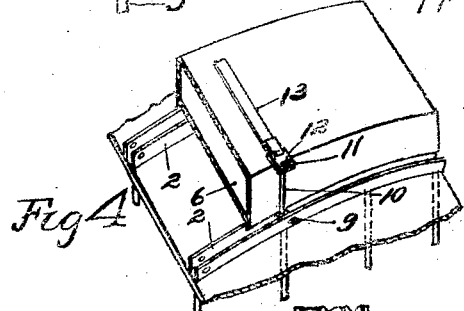
Fig. 4 is an enlarged perspective view of part of the wing and parts connected thereto, some of which are broken away.

Referring to Figs. 1 to 7, 1 designates the wing of an airplane having a single longitudinal wing. 2 designates each of a plurality of curved transverse channel bars, spaced apart and mounted upon the wing 1 on the top thereof.

3 designates vertical supporting struts, which carry the body 4 of the plane and which are arranged in transverse rows respectively attached to the channel bars 2.

5 designates each of two end gas containers, and 6 each of a plurality of intermediate gas containers. The gas containers 5 and 6 are disposed side by side transversely across the wing 1. Each container 6 is mounted on top of two next adjacent channel bars 2, and is provided at opposite transverse sides respectively with two transverse flanges 7 which depend respectively in the two adjacent channel bars 2, thus holding the container from lateral shifting and also enabling the rain falling on the container to run into the channels of the channel bars from which it will be discharged laterally from the wing.

Each container 5 is wedge shape and tapers from the adjacent container to a thin edge terminating at the adjacent end of the wing 1, thus affording minimum resistance to the forward movement of the plane.

The containers 5 and 6 are arcuate to conform to the arcuate cross section of the wing 1, each container in plan being substantially rectangular.

Each container 5 and 6 is provided with a gas filling tube 8 of a type used on pneumatic tires.

For releasably fastening each container 6 to the channel bars 2 upon which they rest, each channel bar has mounted transversely in its flanges bolts 9 to which are respectively loosely pivoted fastening means comprising fastening bars 10, the upper end of each of which has a head 11 provided with two vertical slots 12. Fastening straps 13, which may be of any suitable material, such as aluminum, brass or other metal, extend across each of the containers 6 and are adapted to be extended at their ends respectively through the adjacent slots 12 of adjacent bars 10. The ends of each strap 13 are bent over and fastened, as by soldering to the body of the strap.

When it is desired to remove a container 6, the straps 13 which secure it are cut, new straps being used when another container is substituted for the removed one.

One set of ends of the end straps 13 are fastened to the adjacent heads 11 of the adjacent bars 10 respectively, the straps being extended over the adjacent container 5, and the other ends of the straps being attached to the adjacent end of the wing 1.

Figures 5, 6, 7, 8:
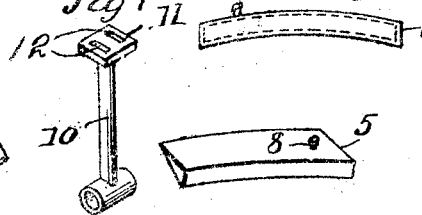
Fig. 5 is a side view of one of the intermediate gas tanks.
Fig. 6 is a perspective view of one of the end gas tanks.
Fig. 7 is a perspective view of one of the fastening bars.
Fig. 8 is a perspective view of one of my improved gas containers adapted for use on the type of airplane having a transverse wing.
Figure 9:
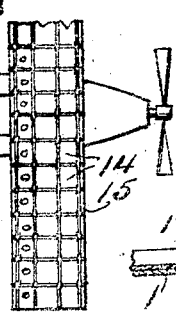
Fig. 9 is a top view of an airplane of the type having a transverse wing provided with my improvement, part of the wing being broken away.

The container 14 of my invention, shown in Figs. 8 and 9 is adapted for use on the type of wings which extend transversely to the body of the plane. The gas container 14 has an arcuate body to conform to the camber of the wing 15 with which it is used. Each end of the container being wedge shaped, as shown in Fig. 8. Each container 14 is provided respectively at its ends with straps 16 adapted to be fastened to the front and rear edges respectively of the wing 15. The container 14 may also be provided with a filling tube 8.

As shown in Fig. 9, the containers 14 are disposed side by side transversely across and resting on the top of the wing 15.

When filled with gas, the containers 5, 6 and 14, which may be made of very light material, such as aluminum or aluminum alloy, afford considerable lifting and sustaining power, and the containers being metal have rigidity which enables them to retain their proper form, whether filled with gas or empty, while, by reason of their disposition and form, they offer a relatively small amount of resistance to the progress through the air of the plane.

Figure 10:
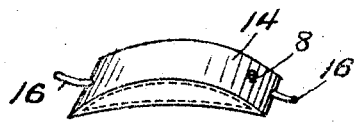
Fig. 10 is a detail of the frame structure.

For fastening the channel bars 2 to the wing 1, as shown in Fig. 10, the struts 3 may have threaded upper ends which extend through the wing 1 and the channels 2. Nuts 17 may be mounted, two on each strut 3, and bearing respectively against the under side of the wing 1 and the top of the adjacent channel bar 2.

I do not limit my invention to the structures shown and described, as many modifications, within the scope of the appended claims, may be made, without departing from the spirit of my invention.

What I claim is:—

1. In an airplane, an airplane wing, a channel bar fastened to the upper side thereof, a gas container mounted on said channel bar and overlapping the channel of said bar, and releasable means for fastening the container to said bar.

2. In a cambered airplane, a cambered airplane wing, a channel bar fastened to the upper side thereof, a gas container having a flange disposed in said channel bar, and releasable means for fastening the container to said bar.

3. In an airplane, an airplane wing, a channel bar fastened to said wing on the upper side thereof, struts attached to said bar, a gas container mounted on said channel bar, and means for releasably attaching the container to said channel bar.

4. In an airplane, an airplane wing, transverse rows of struts fastened to said wing, transverse channel bars on the top of said wing respectively fastened to said rows of struts, transverse gas containers mounted on said channel bars and provided each with flanges depending respectively into the two adjacent channel bars, and means for detachably fastening each of said containers to said adjacent bars.

5. In an airplane, an airplane wing, channel bars fastened transversely to the upper side thereof, gas containers mounted on said channel bars, each container having two flanges respectively depending into the two next adjacent channel bars, and means for releasably fastening said containers to the channel bars next adjacent thereto respectively.

6. In an airplane, an airplane wing, channel bars fastened transversely to the upper side thereof, fastening means attached to said channel bars, gas containers mounted on said channel bars, and straps engaging said fastening means and said containers for holding the latter on said channel bars.

7. In an airplane, an airplane wing, channel bars fastened to the upper side thereof transversely thereto, gas containers mounted on said channel bars, each container having two flanges respectively depending into the two next adjacent channel bars, fastening means attached to each of said channel bars, and straps connecting the fastening means of adjacent channel bars and extending over the adjacent gas containers.

8. In an airplane, an airplane wing, channel bars mounted transversely on the top of said wing, and struts fastened to each of said channel bars.

9. In an airplane, an airplane wing, channel bars fastened to the upper side thereof transversely thereto, gas containers mounted on said channel bars, each container having two longitudinal flanges depending respectively into the two channel bars next adjacent thereto, fastening bars fastened to each of said channel bars between said containers adjacent thereto, and straps connecting the fastening bars of adjacent channel bars and extending over the gas containers on said adjacent channel bars.

10. In a cambered airplane, the combination with the wing of an airplane, of rigid gas holding means comprising a plurality of independent gas containers fastened to the upper side of said wing and having their upper sides disposed so as to present together a substantially smooth upper surface substantially commensurate with the wing and conforming at its under side to the form of the wing.

In testimony whereof I have signed my name to this specification.

MARION W. ADKINS.